(12) United States Patent
Shepherd et al.

(10) Patent No.: US 6,217,182 B1
(45) Date of Patent: Apr. 17, 2001

(54) ELECTRONIC DEVICE WITH DISPLAY AND RECEPTACLE FOR A REMOVABLE INFORMATION STORAGE MEDIUM

(75) Inventors: Mark Robert Shepherd, Basildon; Adrian Garnham, Southend-on-Sea, both of (GB)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/292,206

(22) Filed: Apr. 14, 1999

(30) Foreign Application Priority Data

Apr. 14, 1998 (GB) .................................................. 9807705

(51) Int. Cl.[7] ........................................................ F21V 8/00
(52) U.S. Cl. .............................. 362/23; 362/26; 362/86; 362/31; 362/85; 362/29
(58) Field of Search .................................. 362/23, 29, 30, 362/49, 86, 311, 85, 31; 200/310, 317; 340/815.74

(56) References Cited

U.S. PATENT DOCUMENTS 4,322,780 * 3/1982 Murakami et al. ..................... 362/31
5,255,162 * 10/1993 Kawamoto ............................. 362/31
5,477,432 * 12/1995 Magic et al. ........................... 362/86
5,537,300 * 7/1996 Kraines et al. ........................ 362/86

* cited by examiner

Primary Examiner—Sandra O'Shea
Assistant Examiner—David V. Hobden
(74) Attorney, Agent, or Firm—John Kajander

(57) ABSTRACT

An electronic device includes a backlit display and an illuminated receptacle for a removable information storage medium, for example an audio device such as a cassette radio for a motor vehicle passenger compartment. The audio device (1) has a backlit display (7) and a receptacle (38) for a removable information carrying medium, comprising at least one backlight, and a light diffuser (5) moulded in a translucent plastics material, the diffuser (5) having a display backlight (201) portion and a receptacle indicator portion (202), the backlight being arranged to illuminate the display backlight portion (201) to provide a diffuse backlight for the display (7), and to shine light through the translucent material of the receptacle indicator portion (201) to indicate an entrance to the receptacle (38).

9 Claims, 2 Drawing Sheets

ELECTRONIC DEVICE WITH DISPLAY AND RECEPTACLE FOR A REMOVABLE INFORMATION STORAGE MEDIUM

BACKGROUND OF THE INVENTION

Field of the Invention

The present invention relates to an electronic device with a backlit display and an illuminated receptacle for a removable information storage medium, for example an audio device such as a cassette radio for a motor vehicle passenger compartment.

Electronic devices often have a combination of a backlit display, such as a liquid crystal display, and a receptacle for a removable information storage medium, such as an audio cassette. In many situations, for example in a motor vehicle passenger compartment, it may be difficult for a user readily to locate the entrance to the receptacle, particularly if this is covered over with a flap or door prior to insertion of the information carrier. One known way of indicating the location of the doorway is to provide a light source, for example a light emitting diode (LED), in close proximity with the entrance, so that light from the LED illuminates a part of the entrance so that it can more easily be located. In one conventional arrangement, the LED abuts a transparent light pipe that runs along the length of a doorway.

As regards the display, in one arrangement known from a motor vehicle cassette radio, a display is held on a display carrier on which LEDs are mounted for backlighting the display. A transmissive diffuser, such as frosted clear plastic material, is sometimes provided so that the light is more evenly distributed across the display.

The display LEDs may be mounted on a printed circuit board, on which the display and optionally a diffuser may be clipped or otherwise held. The same circuit board may hold another LED used to feed light into the light pipe to illuminate the entrance to the receptacle.

Whilst such arrangements are effective in providing the desired optical effects, two separate optical components must be provided; one for the display backlight and one of the entrance illumination. Therefore, it is generally necessary for a number of components such as a display carrier, optical light pipes or diffusers, and one or more PCBs to be fixed in place, usually by means of screws to the inner surface of a display or instrument bezel, which may then in turn be clipped to a chassis of the electronic device. This number of separate items and manufacturing steps adds to the cost of the audio device.

Furthermore, in order to benefit from the use of a single PCB, it is necessary for these components to be held in alignment with each other and the display and receptacle entrance. Particularly with moulded plastics components, this places tight tolerances on components' dimensions, which again adds to manufacturing cost.

It would be desireable to provide a more convenient arrangement for an electronic device having a backlit display and illuminated receptacle for a removable information storage medium.

SUMMARY OF THE INVENTION

According to the present invention, there is provided an electronic device having a backlit display and a receptacle for a removable information carrying medium, comprising at least one backlight, and a light diffuser moulded in a translucent plastics material, characterized in that the diffuser has a display backlight portion and a receptacle indicator portion, said backlight being arranged to illuminate the display backlight portion to provide a diffuse backlight for the display, and to shine light through the translucent material of the receptacle indicator portion to indicate an entrance to the receptacle.

The term information storage medium as used herein applies in its widest sense to any analogue or digital data carrier, such as a disc, tape, card, whether pre-recorded, recordable, erasable or permanent, and whether or not including a cartridge or cassette.

The display may be a liquid crystal display, backlit with a convenient backlight such as an array of light emitting diodes (LEDs).

The translucent material may be white, in which case the colour of the backlight illumination is determined just by the color of the backlight source. It would, however, be possible for the translucent material to have a different colour, particularly if the backlight was non-monochromatic.

The diffuser could be made from two or more components, for example one for the display portion and one for the indicator portion, but preferably the diffuser is of unitary construction, for example being integrally moulded in a plastics material.

Usually, the entrance will be elongate, as would be the case for a compact audio cassette, or a compact disc. The indicator portion may then most conveniently extend along substantially the full length of the entrance, so that the user can more readily insert or retrieve the storage medium into or from the receptacle. It is not necessary however, for the illumination indicating the location of the receptacle to be so bright that the entrance is fully illuminated. It is sufficient only that the illumination is bright enough to indicate the location of the receptacle when this would otherwise be difficult to see, for example as would be the case in a dimly lit motor vehicle passenger compartment at night.

In a preferred embodiment of the invention, the indicator portion terminates in an indicator strip that runs along the length of the entrance. Since the user in most cases will normally be looking somewhat down on the electronic device, this strip may be along a lower edge or side of the entrance.

Often, the receptacle will have a door at the entrance, and the indicator strip may then be aligned with the door so it is at least partially visible at the edge of the door.

The invention is most useful when the display is in proximity with the receptacle, by which it is meant that the receptacle is no farther, or little farther, from the at least one backlight than the farthest part of the backlit display illuminated by the same backlight. The same backlight may then efficiently be used to illuminate both the display and indicator portions, without the need for intervening optical elements, such as lenses, fibre optics, or light pipes. In a preferred embodiment, said backlight is disposed between the display portion and indicator portion.

One way in which the indicator portion may be formed is in the shape of a hollow shell of the translucent material. The shell then has a cusp at the entrance to the receptacle, said backlight being arranged to illuminate the inside of the shell so that light is transmitted through the translucent material of the cusp of the shell to indicate the entrance to the receptacle.

The display may be backlit in various ways. One way is if the diffuse back illumination for the display is provided by light transmitted through the translucent material of the display backlight portion. Another way is if the diffuse back illumination of the display is provided by light incident upon and scattered away from the translucent material of the display portion. Most of the scattered light will be from the surface of the translucent material although some would be back scattered from the bulk of the material near surface.

Such surface scattering provides a relatively efficient means of spreading the light from the light source, with minimum absorption and stray reflection by the translucent material, particularly if the light upon a backlight surface of the display portion is at a shallow angle over substantially most or all the area. The term shallow angle is used herein to refer to an angle within 45° of the surface at a point on the backlight surface, and preferably less than about 30°. The efficiency of illumination becomes more important for larger area displays owing to the need otherwise to employ a large number of light sources to provide sufficient illumination.

Therefore, at least one backlight of the display portion may be disposed to one side of the display portion, and illuminates the backlight surface of the display portion at a shallow angle. Preferably the display portion has a linear array of backlights disposed along an edge of the display portion, the backlight surface of the display portion being concave in a plane perpendicular to the axis of the linear array. The concave shape may have an essentially parabolic shape, so that the illumination intensity of each unit area of the backlight surface is relatively constant as the light diverges from the or each light source.

BRIEF DESCRIPTION OF THE DRAWINGS

The invention will now be further described by way of example with reference to the accompanying drawings, in which.

DETAILED DESCRIPTION OF THE PREFERRED EMBODIMENTS

Figure 1:
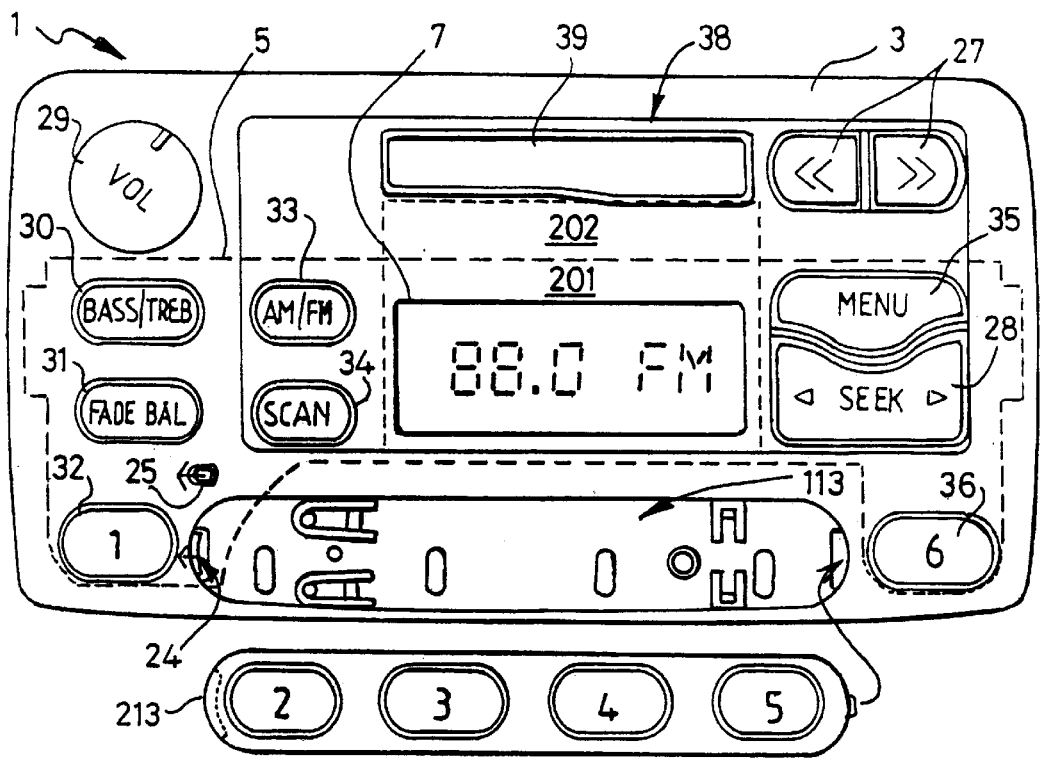
FIG. 1 is a front view of a radio cassette audio device for use in a motor vehicle passenger compartment, showing fixed and removable bezel portions and in outline an integrally moulded button and display carrier with a light diffuser having a display backlight portion and a receptacle indicator portion according to the invention.

FIG. 1 illustrates a bezel assembly 1 of a cassette radio audio device for use in a motor vehicle passenger compartment. The bezel assembly has a fixed front panel or bezel 3 provided with various holes for a liquid crystal display 7, and control buttons 27–36. The bezel also has a receptacle 38 for an audio compact cassette, the receptacle having a spring loaded door 39 that opens when a cassette (not shown) is inserted into the receptacle 38.

For reasons of security against theft, a portion 213 of the bezel is seated within a recess 113 in the fixed bezel portion 3, and is demountable upon activation of a latch mechanism 24 via a lever arm 25 that protrudes through the bezel fixed portion 3.

Although not shown, the bezel assembly 1 snaps onto the cassette radio frame in a known manner.

Figure 2:
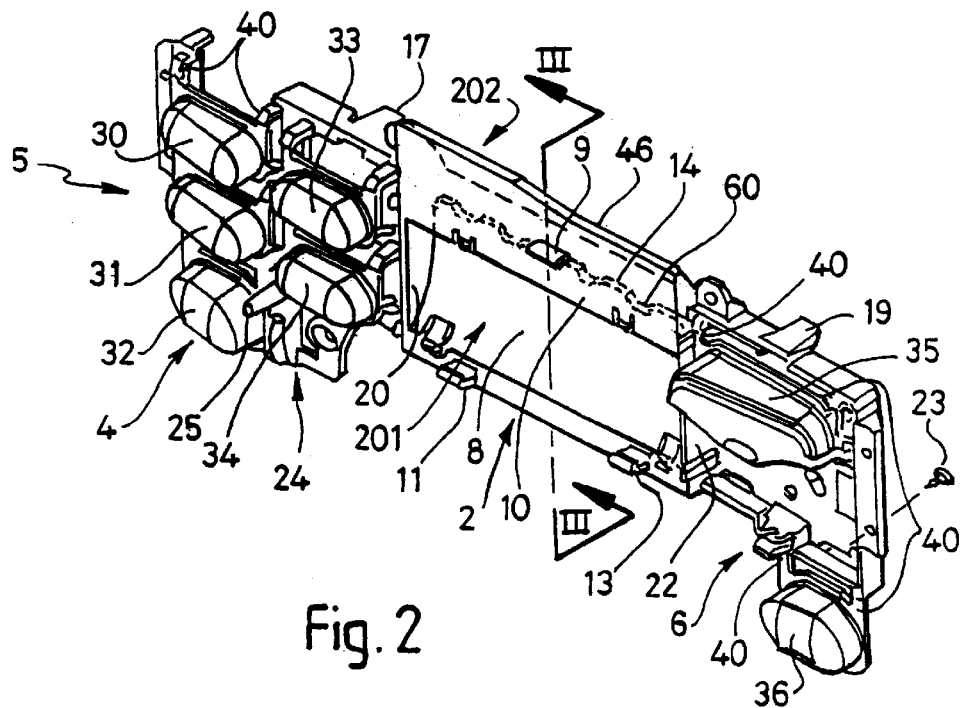
FIG. 2 is a perspective view of a button and display carrier of FIG. 1.

Referring now also to FIG. 2, a button and display carrier 5 of unitary construction that supports and is integrally moulded with several of the buttons 30–36, and that supports the display 7, is held by self tapping screws 23 to the inside back surface of the bezel fixed portion 3. The carrier 5 has a generally rectangular form with a central light diffuser 2 and two button portions 4,6 arranged on opposite sides of the diffuser 2. The carrier has three clips 9,11,13 extending forwards of the carrier and to which the display 7 mounted.

The carrier is integrally moulded in a white translucent plastics polycarbonate material, sold by GE Plastics under the trade mark Lexan 123R.

Figure 3:
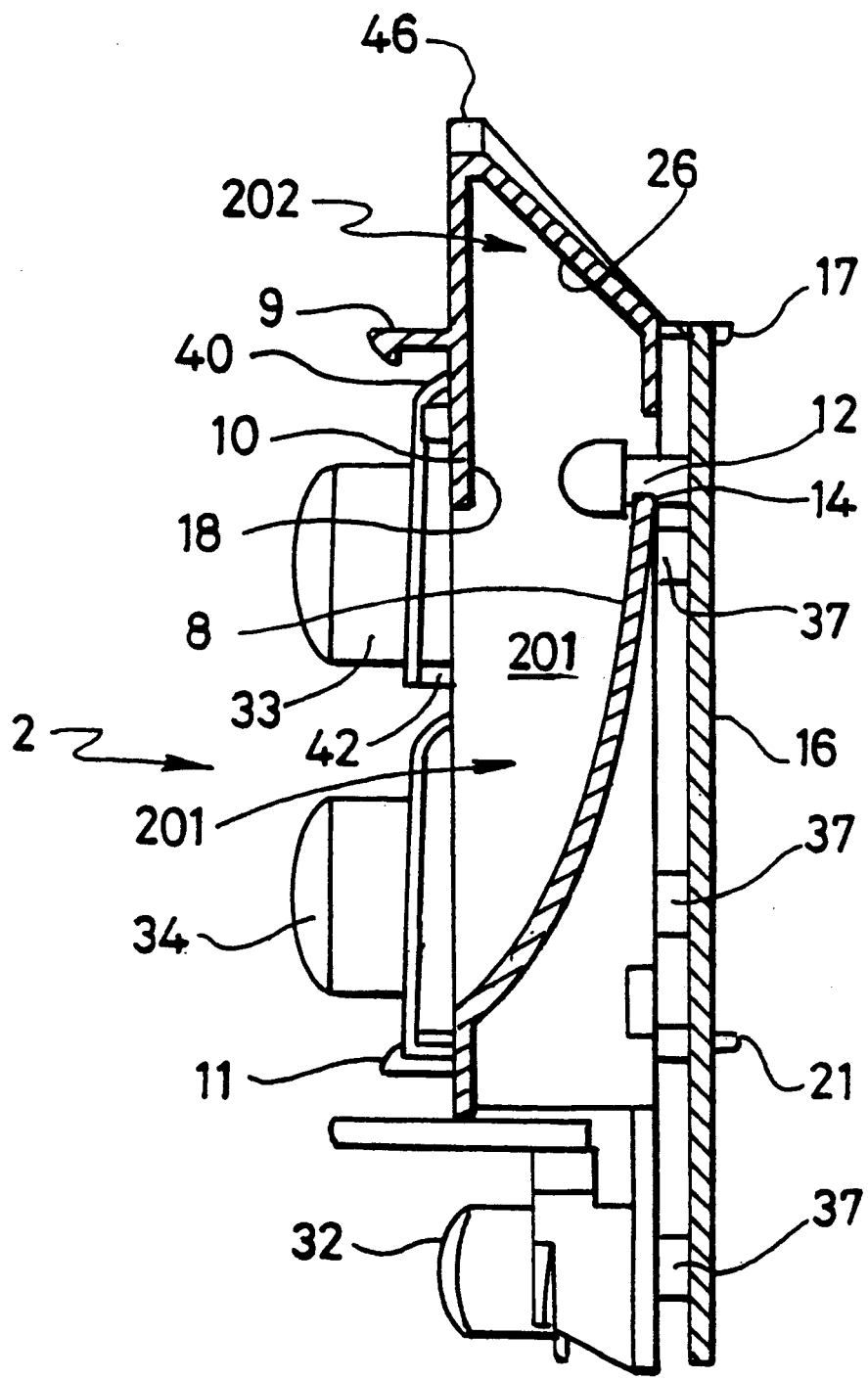
FIG. 3 is a cross-section view through the button and display carrier of FIG. 1, taken through line III—III showing the display backlight portion and receptacle indicator portion.

With reference now also to FIG. 3, the diffuser 2 has a display backlight portion 201 and a receptacle indicator portion 202. The display portion 201 has a rectangular and concave backlight area 8 for back illuminating the display 7, disposed generally behind and below a pelmet 10 that is part of the indicator portion 202, extending across the upper edge of the display portion 201. The indicator portion 202 has a concave hollow interior formed by generally planer converging surfaces 18,26, which meet at an apex strip or cusp 46.

Six blue-green light emitting diodes (LEDs) 12 are equally spaced behind the length of the pelmet 10, along a top edge 14 of the backlight area 8. Each LED 12 is mounted on a single circuit board 16 that is clipped by clips 17,19 and a locating stud 21 to the back of the carrier 5, with each display LED 12 resting in a shallow locating feature 60 on the backlight area top edge 14.

Because the LEDs 12 are substantially surrounded by the display portion 201 and indicator portion 202, most of the light from the LEDs 12 is directed either to the display portion 201 or the indicator portion 202. Part of the light from the LEDs 12 will be directed generally downwards onto the backlight area 8, either directly or by back scattering from the planar surfaces 18, 26 inside the pelmet 10.

Light that is incident upon the hollow concave interior of the indicator portion 202 and that is not back scattered will tend to be funnelled upwards towards the apex strip 46 of the indicator portion. Some light will be lost from transmission through the forward and rearward outside surfaces of the indicator portion 202. In most applications, this is not a problem, because the LEDs 12 need to be sufficiently bright to back illuminate the display 7, even in daylight conditions, and considerably less light is needed simply to illuminate the apex strip 46 sufficiently so that this is visible to indicate the location of the receptacle 38, for example in dim or dark conditions.

As regards the light that is incident upon the backlight area 8 directly from the LEDs 12, the uppermost part of the backlight area 8 is essentially perpendicular to the axis of the LEDs 12, and farther away from the LEDs curves forwards towards the front of the carrier 5. The curve is in the plane of FIG. 2 and has a parabolic shape so that areas further from the LEDs 12 receive more incident light than would otherwise be the case. This helps to provide a more even back illumination of the display 7. At the sides of the backlight area, the display portion has end portions 20,22 that scatter incident light back towards the backlight area 8 and the display 7, so improving the evenness of the illumination.

In an alternative embodiment of the invention not illustrated in the drawings, a number of LEDs are arranged behind the backlight area to shine through the translucent material. In this alternative embodiment, the rear planar surface 26 of the indicator portion 202 extends behind the top edge 14 of the backlight portion 8 so that this can capture light from the LEDs behind the backlight portion 8. However, such an arrangement requires more LEDs than the illustrated embodiment in order to achieve the same level of illumination, owing to back scattering of light in a direction away from the display and increased absorption of light in transmission through the translucent material.

The button portions 4,6 are formed from the same translucent polycarbonate material, but will in general, have front surfaces which have been partially covered in an opaque coating (not shown), so that each integrally moulded button 30–36 may display information regarding the function of the button when backlighted through the uncoated portions by light sources, which may be button illumination LEDs 37 mounted on the circuit board 16.

Each button 30–36 has a convex shape that projects forwards through an aperture in the bezel fixed portion 3, and is linked to the rest of the carrier 5 by a flexible linkage 40 that extends generally perpendicularly with respect to the plane of the carrier 5, and allows the button to rotate about an axis that is generally in the plane of the carrier. The flexible linkage in the present example is a pair of hinges 40 integrally moulded with each of the buttons 30–36, and connecting opposite upper corners of a button with the rest of the carrier 5. When a user pushes one of the buttons 30–36 from its rest position, the lower portion of the button rotates inwards so that an inwardly directing finger 42 in the middle lower portion of the button can make contact with an electrical contact (not shown) on the circuit board 16.

The integrally moulded button and display carrier and audio device described in detail above may be adapted for use with any other type of electronic apparatus in which at least one backlit display and a receptacle for a removable information carrying medium are required. The use of a single integrally moulded carrier with the correct optical properties to allow such illumination of the display and receptacle entrance allows cost saving to be made in the manufacture of the carrier and other components associated with the carrier, such as a bezel and circuit board. Particularly in components destined for high volume production, such as a cassette radio for a motor vehicle, even a small cost reduction in each component can amount to a significant saving.

What is claimed is:

1. An electronic device (1) having a backlit display (7) and a receptacle (38) for a removable information carrying medium, comprising at least two light sources (12), and a light diffuser (2) moulded in a translucent plastic material, characterized in that the diffuser (2) has a display backlight portion (201) and a receptacle indicator portion (202), said light source (12) being arranged to illuminate the display backlight portion (201) to provide a diffuse backlight (8) for the display (7), and to shine light through the translucent material of the receptacle indicator portion (202) to indicate (46) an entrance (39) to the receptacle (38), the diffuse back illumination (8) of the display (7) being provided by light incident upon and scattered away from the translucent material of the display portion (201), the display portion (201) having a linear array of light sources (12) disposed along an edge (14) of the display portion (201), the backlight surface (8) being concave in a plane perpendicular to the axis of the linear array (12).

2. An electronic device (1) as claimed in claim 1, in which the light diffuser (2) is of unitary construction.

3. An electronic device (1) as claimed in claim 1 in which the entrance (39) is elongate, the indicator portion (202) extending along substantially the full length of the entrance (39).

4. An electronic device (1) as claimed in claim 3, in which the indicator portion (202) terminates in an indicator strip (46) that runs along the length of the entrance (39).

5. An electronic device (1) as claimed in claim 4, in which the receptacle (38) has a door (39) at the entrance, and the indicator strip (46) is aligned parallel with the door.

6. An electronic device (1) as claimed in claim 1, in which said light source (12) is disposed between the display portion (201) and indicator portion (202).

7. An electronic device (1) as claimed in claim 1, in which the indicator portion (202) is formed from a hollow interior of the translucent material and includes a cusp (46) at the entrance (39) to the receptacle (38), said light source being arranged to illuminate the inside of the shell so that light is transmitted through the cusp (46) of the shell to indicate the entrance (39) to the receptacle (38).

8. An electronic device (1) as claimed in claim 1, in which the diffuse back illumination (8) for the display (7) is provided by light transmitted through the translucent material of the display portion (201).

9. An electronic device (1) as claimed in claim 1, in which said light source (12) is disposed to one side of the display portion (201), and illuminates obliquely a backlight surface (8) of the display portion (201).

\* \* \* \* \*